Oct. 10, 1933.  R. F. PEO  1,929,791
CONTROLLER FOR SHOCK ABSORBERS
Filed Aug. 10, 1931  3 Sheets-Sheet 1
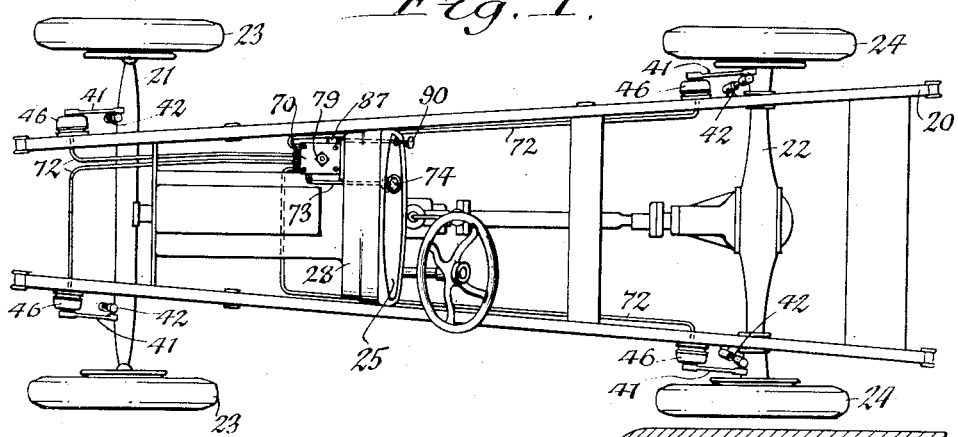
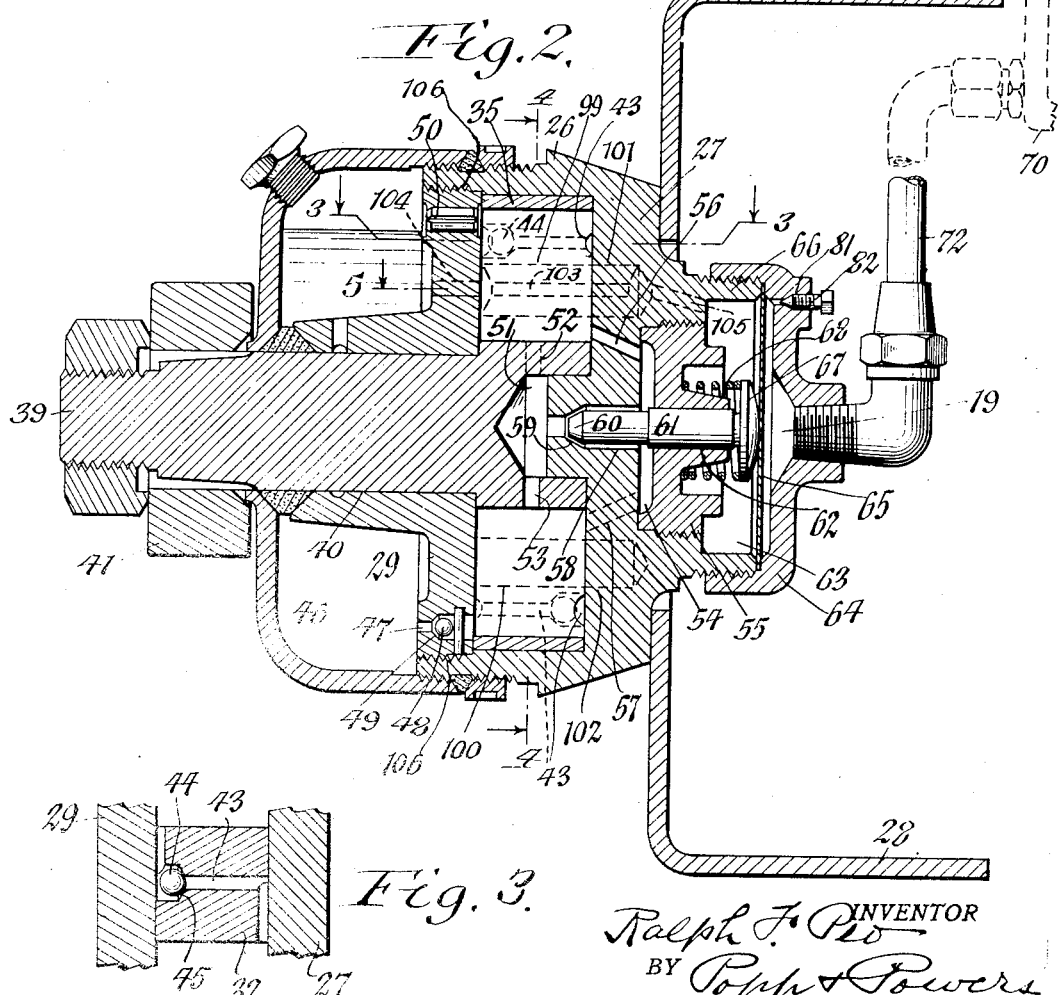

Oct. 10, 1933.   R. F. PEO   1,929,791
CONTROLLER FOR SHOCK ABSORBERS
Filed Aug. 10, 1931   3 Sheets-Sheet 2
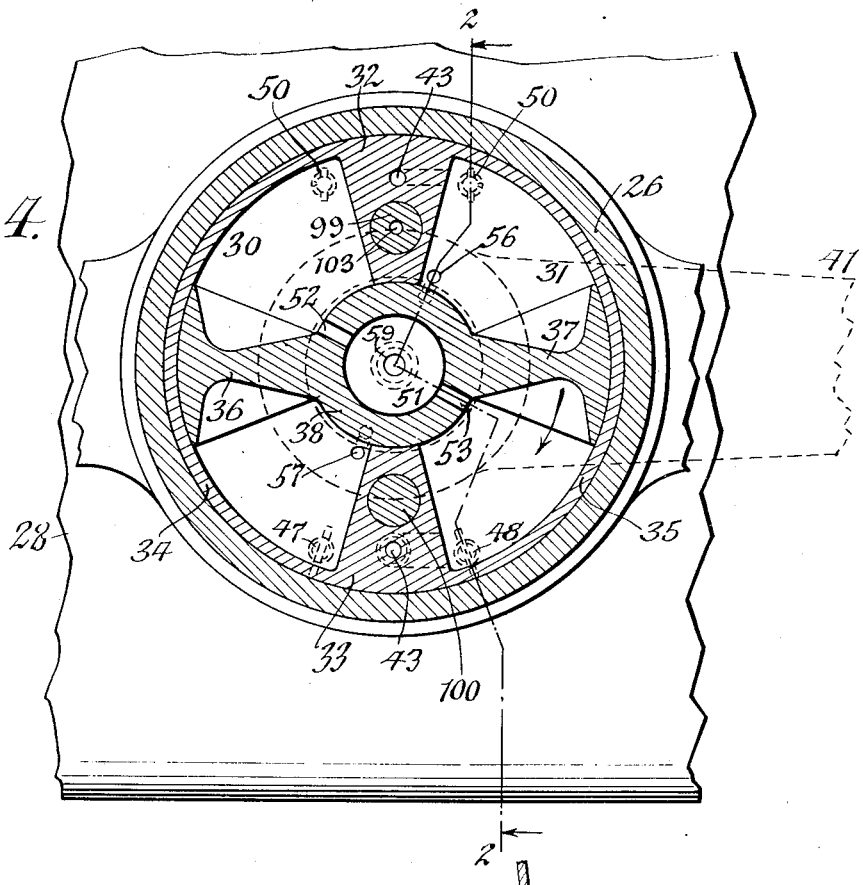
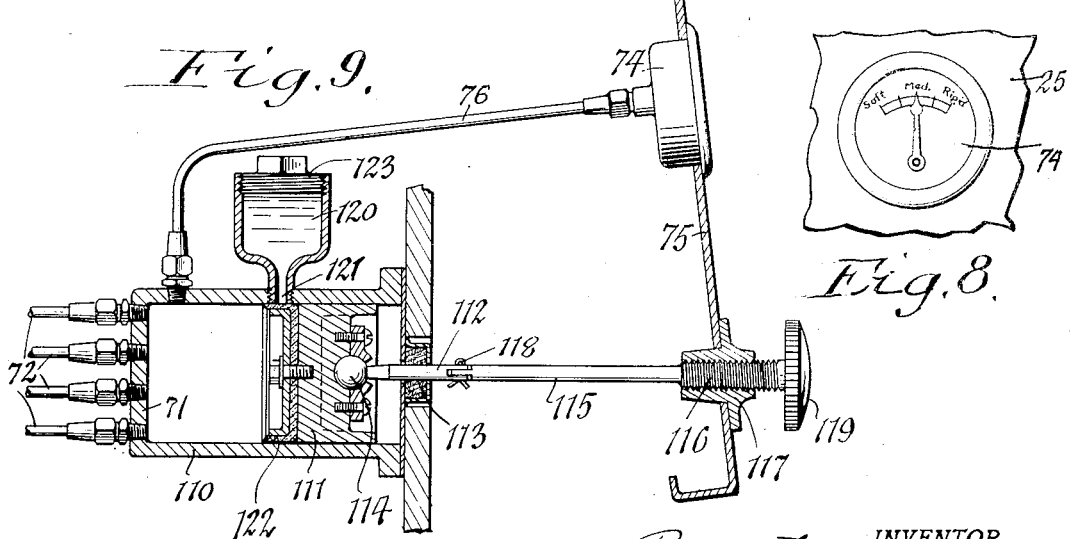
INVENTOR
Ralph F. Peo
BY Popp & Powers
ATTORNEYS

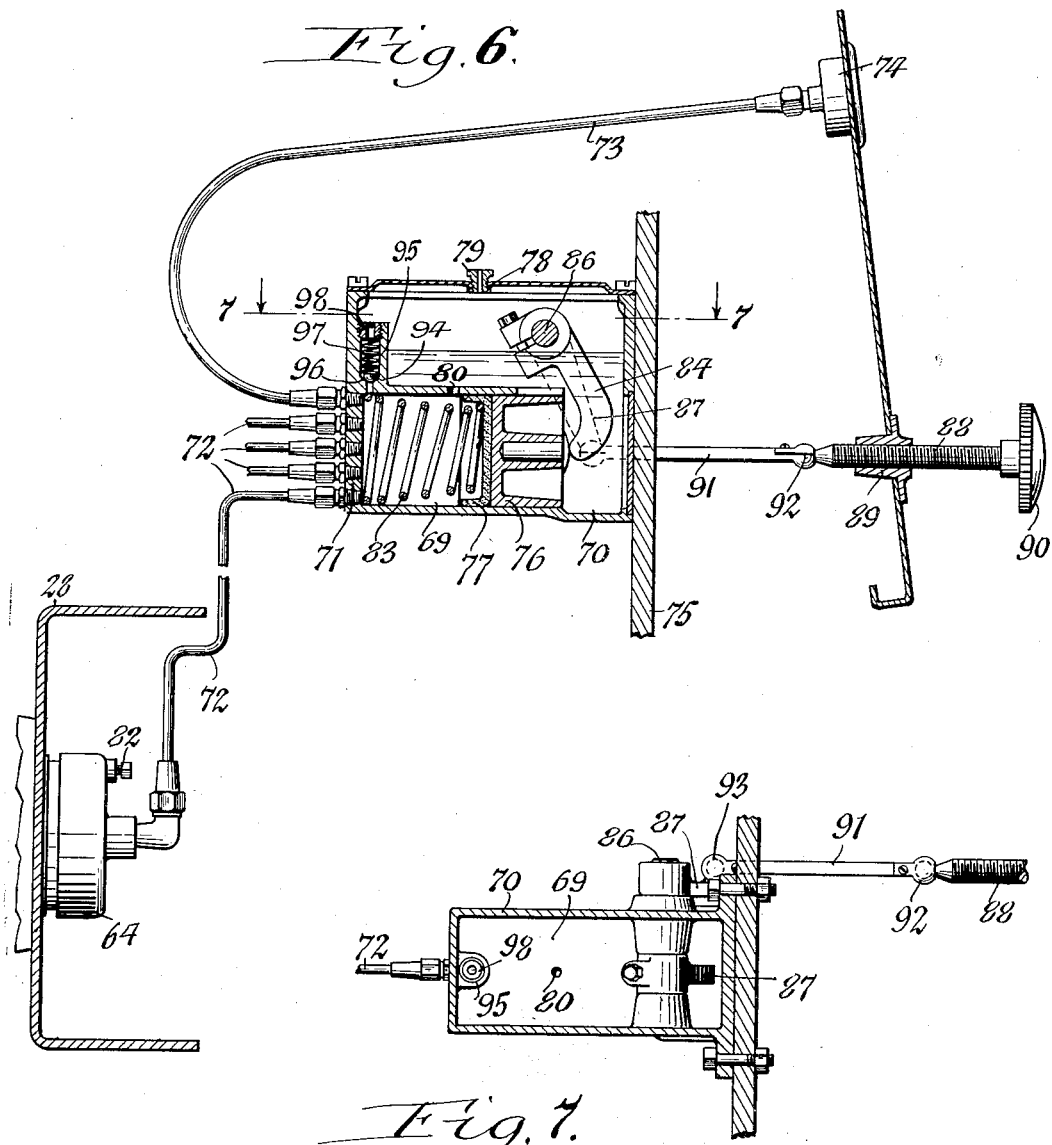

Patented Oct. 10, 1933

1,929,791

UNITED STATES PATENT OFFICE 1,929,791

CONTROLLER FOR SHOCK ABSORBERS

Ralph F. Peo, Buffalo, N. Y., assignor to Houde Engineering Corporation, Buffalo, N. Y., a corporation of New York Application August 10, 1931. Serial No. 556,121

16 Claims. (Cl. 188—87)

This invention relates to means for controlling shock absorbers of automobiles and the like at a place remote from the location of the absorbers and to so organize these means that the resistance or absorbing capacity of the instruments may be varied manually as required to suit specific conditions and the operator may also readily observe whether the absorber is offering a comparatively soft, medium or rigid resistance to the movement of the load imposed on the same.

In the accompanying drawings:

Figure 1 is a diagrammatic top plan view of the chassis of an automobile showing my invention embodying a shock absorbing system in which a shock absorber is applied to each end of the front axle and also to each end of the rear axle.

Figure 2 is a vertical longitudinal section of one form of hydraulic shock absorber for use in connection with my invention, on an enlarged scale, this section being taken on line 2—2 Fig. 4.

Figure 3 is a fragmentary horizontal section taken on the correspondingly numbered line in Fig. 2.

Figure 4 is a vertical cross section taken on line 4—4 Fig. 2.

Figure 5 is a fragmentary horizontal section taken on line 5—5 Fig. 2.

Figure 6 is a vertical longitudinal section, on an enlarged scale, showing more particularly the adjustable controlling device whereby the effect of a plurality of shock absorbers may be adjusted simultaneously and the load which is imposed upon the same may be ascertained visually.

Figure 7 is a horizontal section taken on line 7—7 Fig. 6.

Figure 8 is a face view of one form of indicator suitable for use in indicating the working effect of the instruments.

Figure 9 is a fragmentary vertical longitudinal section showing a modified form of the controlling mechanism as compared with that shown in Figs. 6 and 7.

In the following description similar characters of reference indicate like parts in the several figures of the drawings.

Although this invention may be embodied in automobiles and similar structures which may vary in general construction, that shown in Fig. 1 as an example of one with which my invention may be associated comprises a main frame 20, front and rear axles 21, 22 movably connected with the front and rear ends of the main frame by spring systems which may be of any suitable or well-known construction, a pair of front wheels 23 mounted on opposite ends of the front axle, a pair of rear wheels 24 mounted on opposite ends of the rear axle, and an instrument board or panel 25 mounted on the central part of the main frame adjacent to the driver's seat.

A hydraulic shock absorber is interposed between the end of each axle and the adjacent part of the main frame, which absorber may be of any suitable type, and which in its general organization may be constructed as follows:—

Referring to Figs. 1–5 the numeral 26 represents the peripheral wall of the body of the shock absorber which in this instance has its rear fixed head 27 secured to the adjacent part of one of the side bars 28 of the main frame and is provided with a removable front head 29.

The space between the peripheral wall and front and rear heads of the body is of cylindrical form and divided into two semicylindrical working chambers 30, 31 by a partition consisting of upper and lower sections 32, 33 which are arranged on diametrically opposite sides of the axis of the body and which are connected with each other by means of semi-circular linings 34 and 35, which latter are fitted against the adjacent parts of the bore of the peripheral wall 26 of the body, as shown in Figs. 2 and 4.

Within the working chambers are two oscillating pistons 36, 37 which engage with the bore of the lining sections 34 and 35 and also with the front and rear walls of the body, and are arranged on opposite sides of an oscillating hub 38 which engages opposite sides of its periphery with the opposing inner ends of the partition sections 32, 33, as shown in Figs. 2 and 4.

This hub is arranged on the rear end of an operating rock shaft 39 which projects forwardly through and is journaled in a bearing 40 formed centrally on the front head 29 of the body and is provided at its front end externally of the instrument with an operating rock arm 41 which is connected by a link 42 with the adjacent part of one end of the respective axle of the chassis.

As the axles move toward the frame of the chassis upon the wheels striking an obstruction in the road, the pistons are turned in a direction opposite to that indicated by the arrow in Fig. 4, which movement may be referred to as the deflection stroke of the instrument and produces what may be referred to as a low compression of the resistance liquid contained in the working chambers.

During the movement of the axles toward the frame of the chassis which is generally known as the rebound of the spring system, the pistons in each shock absorber are moved in a reverse direction indicated by the arrow in Fig. 4 and thereby produces a high compression effect upon the resistance liquid within the working chambers of the several shock absorbers.

During the low compression strokes of the pistons of each shock absorber the resistance liquid is permitted to pass from the low pressure end of each working chamber with comparative freedom into the high pressure end of the other working chamber through by-passes 43, formed respectively in the partitions 32 and 33, but during the high pressure strokes of these pistons the movement of resistance liquid through these by-passes 43 is prevented by means of check valves 44 arranged in these by-passes and engaging with valve seats 45 therein, as shown in Fig. 3.

Resistance liquid is supplied to the working chambers as required from a replenishing chamber 46 arranged in front of the body and surrounding the bearing 40 and shaft 39, which resistance liquid flows from the lower part of the replenishing chamber into the lower end of one or both working chambers through one or more replenishing passages 47 formed in the lower part of the front head 29. This replenishing liquid is drawn through this passage from the replenishing chamber 46 into the working chambers whenever a suction occurs in the latter, but when a pressure exists in the lower ends of either one of the working chambers then resistance liquid is prevented from backing up from the working chambers into the replenishing chamber by a check valve 48 arranged in each replenishing passage and engaging with a valve seat 49 therein.

Air is permitted to escape from the upper ends of the working chambers through vent ports 50 in the upper part of the front head 29 and into the upper part of the replenishing chamber.

A predetermined amount of resistance liquid is permitted at all times to pass back and forth between the high and low pressure ends of the respective working chambers both during low and high pressure strokes of the pistons, and the amount of this flow is capable of being adjusted in order to vary the shock absorbing effect of the instrument in accordance with the load imposed upon the same or the character of the ride which is desired.

The valve mechanism for this purpose in the present instance is preferably organized as follows:

The numeral 51 represents a front regulating chamber formed centrally in the hub of the pistons and connected with the high pressure ends of the working chambers by means of front regulating ports 52, 53 extending radially from the bore of the front regulating chamber 51 to the periphery of the hub 38, as shown in Figs. 2 and 4.

The numeral 54 represents a rear regulating chamber formed between the rear side of the head 27 of the body and a screw plug 55 secured to the respective end of the body and connected with the low pressure ends of the working chambers by means of rear regulating ports 56, 57 formed in the upper and lower parts of the rear head 27 of the body, as shown in Figs. 2 and 4.

The central part of the rear head of the body between the front and rear regulating chambers 51 and 54 is provided with a longitudinal regulating passage 58 which connects the front and rear regulating chambers 51 and 54 and is provided with a rearwardly facing valve seat 59. The numeral 60 represents a regulating valve arranged in the passage 58 and movable toward and from the seat 59 for the purpose of varying the freedom of flow of the resistance liquid back and forth between the high and low pressure ends of the working chambers through the regulating conduit formed by the regulating chambers 51, 54, ports 52, 53, 56 and 57, and passage 58 and thereby varying the shock absorbing capacity of the instrument accordingly.

This regulating valve is arranged at the front end of a valve stem 61 which slides lengthwise in an axle guideway 62 formed in the center of the screw plug 55, as shown in Fig. 2.

On its rear side around the valve stem 61 the rear head 27 of the absorber body is provided with an annular flange or rim 66 to which is secured a screw cap 64. The space between this rear head 27 and its flange 66 on one side and the cap 64 on the other side is divided by a diaphragm or flexible piston 65 into a front balancing chamber 63 and a rear pressure chamber 19. This diaphragm is held in place by clamping the same at its margin between the flange 66 and the marginal part of the cap 64, as shown in Fig. 2.

At its rear end the valve stem 61 is provided with a head 67 which bears against the front side of the diaphragm 65 and is yieldingly held in engagement therewith by means of a spring 68 interposed between the front side of the head 67 and the rear side of the screw plug 55.

The pressure chamber 19 in rear of the diaphragm 65 is adapted to contain a liquid forming part of a column of liquid which is utilized for adjusting the position of the regulating valve 60 with reference to its seat 59. The adjusting means whereby this liquid column is utilized in this manner may be variously constructed but a practical form of the same represented in Figs. 6, 7 and 8 is constructed as follows:

The numeral 69 represents the horizontal cylinder of a liquid column adjusting device which cylinder is preferably formed in the lower part of a tank 70 so that the front end of this cylinder is closed by a head 71 and the rear end of the cylinder opens into the lower part of this tank. The front part of this adjusting cylinder 69 is connected with the pressure chamber 19 by means of a conduit 72 which preferably consists of a tube or pipe. The front end of the adjusting cylinder 69 is also connected by means of a conduit 73 having the form of a tube or pipe, with a liquid pressure indicator or gage 74 which is mounted on the instrument board 25 while the tank 70 and its associated parts are mounted on a wall or bracket 75 arranged immediately in front of this instrument board.

The adjusting cylinder 69, the several tubes or pipes 72, the pressure chambers 19 of the several shock absorbers, the liquid pressure indicator 74 and the tube 73 connecting the latter with the adjusting cylinder 69 are all filled with a liquid column which is under pressure and also capable of adjustment so as to cause each of the diaphragms or pistons 65 to be pushed forwardly in opposition to the springs 68 and thereby yieldingly retain the several regulating valves 60 in the desired position relative to their respective seats 59, and cause the shock absorbers to operate with the desired cushioning effect. The adjustment of the liquid forming a multiple column is effected simultaneously and uniformly with reference to the several shock absorbers by means of a piston or equivalent member 76 which is movable lengthwise in the rear or inner end of the adjusting cylinder 69 and is provided at its front end with a packing 77 which avoids leakage between this piston and the bore of this cylinder. The filling of this cylinder 69 and the various tubes 72, 73 and the pressure chambers 19 is preferably effected by filling the tank 70 through an opening 78 in its top which is normally closed by means of a plug 79. This tank 70 is filled to such an extent that the cylinder 69 therein is submerged. Upon moving the piston 76 rearwardly so that the front end of its packing 77 uncovers an opening 80 in the top of this cylinder, liquid will flow from the tank 70 through the opening 80 into the cylinder 69 and into the several pipes 72 and pressure chambers 19 until the latter and all the passages communicating therewith are filled with liquid.

During this time the air in these several conduits and shifting chambers 19 is permitted to escape through vent openings 81 in the upper part of each of the caps 64, which vent openings are closed by means of screw plugs 82 after these spaces have been completely filled with liquid. Thereafter the piston 76 is moved forwardly so as to cover the replenishing port 80 and during the subsequent normal operation of this instrument the working or operating limits of this piston is confined to a place between the front head 71 and the filling opening 80 and is not withdrawn backwardly far enough to uncover the latter, except for replenishment of leakage.

The rearward movement of the adjusting piston 76 is effected by means of a spring 83 interposed between the front head 71 and the packing 77 and the forward movement of the same is effected by an adjusting device which preferably though not necessarily, comprises an inner rock arm 84 arranged within the rear part of the tank 70 and engaging its lower end with the rear end of the piston 76, a transverse rock shaft 86 journaled in the upper part of the tank 70 and connected with the upper end of the rock arm 84, an outer rock arm 87 connected with the outer end of the rock shaft 86, an adjusting screw 88 working in a threaded socket or sleeve 89 on the lower part of the instrument board 25 and provided at its rear end with a finger piece or button 90, and a shifting rod 91 connected by a universal joint 92 with the front end of the screw 88, and by a universal joint 93 with the lower end of the rock arm 87, as shown in Figs. 6 and 7.

After the cylinder 69 and the several tubes 72, 73 and pressure chambers 19 connected therewith have been filled with liquid the screw stem 88 is adjusted forwardly so as to cause the rock arm 84 to push the piston 76 forwardly and close the port 80 and also subject the various branches of the liquid column to pressure which will cause the several diaphragms 65 to be also moved forwardly together with the controlling valves 60 associated therewith. This permits of restricting the regulating passages of the several shock absorbers in accordance with the desired resistance which is required to suit the particular load which is to be carried or adapt the absorber for operating under different conditions.

During such forward movement of the adjusting piston 76 some of the liquid column is forced through the pipe 73 for operating on the mechanism of the indicator 74 so that the driver of the car is able to see under what pressure the shock absorbers are operating.

When it is desired to set the shock absorbers so as to offer a very heavy, hard or comparatively rigid resistance then the adjusting piston 76 is moved forwardly so that the several branches of the adjustable liquid column will cause the regulating valves 60 to close the regulating passages to a considerable extent and thereby cause the movement of the resistance liquid from one end of the working chambers to the other to be restricted to a greater extent.

When the adjusting piston 76 is moved into the central part of its operative stroke a greater amount of the column of liquid will be permitted to enter the adjusting cylinder 69 and thus permit the several retracting springs 68 to push the valves 60 to a correspondingly greater distance away from their respective seats 59 and thus enable a larger quantity of the resistance liquid in the shock absorbers to pass back and forth between the high and low pressure ends of their working chambers, thereby reducing the shock absorbing effect of the instruments and causing the same to carry the load with a medium cushioning effect.

When it is desired to produce what may be termed a soft ride or one that carries the load with a relatively light cushioning effect then the adjusting piston 76 is moved into the rearmost position of its working stroke without, however, uncovering the replenishing port 80, thereby permitting a still greater quantity of the adjusting liquid column to enter the adjusting cylinder 69, whereby the springs 68 are permitted to retract the several valves 60 to a still greater extent and thereby increase the freedom of movement of the resistance liquid back and forth between the high and lower pressure ends of the several working chambers accordingly.

By means of this adjusting device any variation of shock absorbing effect is obtainable between the certain extremes and thereby enable the cushioning effect of the instruments to be readily adapted to any particular requirement.

By observing the dial of the gage or indicating mechanism 74 it is possible to adjust the effect of the shock absorbers for producing a medium or rigid cushioning effect or any graduation of cushioning effect between the points just mentioned to suit different conditions. This indicator also permits of determining the particular work which the shock absorbers are doing at any particular time so that a check-up and a correction of the instruments may be effected if this should be required.

Inasmuch as the entire adjusting cylinder 69 and its piston 76 are submerged in a body of regulating or adjusting liquid within the tank 70, any leakage of liquid between the cylinder 69 and the piston 76 will be caught by the replenishing tank 70 ready to be used again.

If at any time the column of liquid in the adjusting cylinder 69, the tubes 72, the several pressure chambers 19, and the indicating device 74 should be subjected to an abnormally high pressure, bursting of any of the parts confining the adjusting liquid column is prevented by means of a safety valve 94 which is arranged in a relief passage 95 leading from the front part of the adjusting chamber 69 to the upper part of the tank 70, which safety valve is yieldingly held against a seat 96 in this relief passage by means of a spring 97 interposed between the safety valve 94 and a screw plug 98 in the top of this relief passage, as shown in Fig. 6.

When it is desired to operate all of the shock absorbers with the same degree of effectiveness then the retracting springs 68 are all made of the same strength but if it is desired to cause these several shock absorbers to operate one differently from another, in accordance with some special conditions, then the springs will be of different strengths, as for example if it is desired to carry a heavier load on the front axle of a car than the respective springs 68 which are associated with the shock absorbers of the rear axle, which latter are only required to carry a relatively light load. In this manner all the shock absorbers may be adjusted simultaneously from the same place adjacent to the driver's seat or other point remote from the absorbers themselves and still permit each absorber to operate individually according to the strength of the tension spring 68 which has been incorporated in the same.

In order to permit each diaphragm 65 to move freely forward and backward in response to the variation in pressure which is exerted against opposite sides of the same, the balancing chamber 63 between the front side of this diaphragm and the rear head 27 and plug 55 of the body is placed in communication with the replenishing chamber 46 so that when the diaphragm is deflected rearwardly liquid will be drawn from the replenishing chamber into the balancing chamber and thereby avoid the formation of a vacuum in the latter, and when the diaphragm is deflected forwardly some of the liquid is discharged from the balancing chamber 63 into the replenishing chamber and thereby avoids encountering any resistance to the movement of the diaphragm at this time. Various means may be employed for placing the balancing chamber in communication with the replenishing chamber for this purpose, but this is preferably accomplished as follows:

In the preferred organization of the shock absorber the partition sections 32 and 33 together with the segmental linings 34 and 35 are held against rotation by means of dowels 99 and 100 arranged lengthwise in the upper and lower partition sections and projecting at their rear ends into recesses 101, 102 formed in the rear head 27 of the absorber body, thereby interlocking these partitions and the lining sections with the body and preventing relative rotation of the same. The upper dowel 99 is provided with a longitudinal balancing passage 103 which communicates at its front end with an opening 104 formed in the upper part of the removable front head 29 of the absorber body and leading into the replenishing chamber, while the rear end of this passage 103 communicates with a passage 105 formed in the upper part of the rear head 27 of the absorber body and leading into the upper part of the balancing chamber 63.

The passages 103, 104 and 105 by this means establish communication between the upper part of the replenishing chamber and the upper part of the balancing chamber so that resistance liquid is free to flow back and forth between these chambers and thereby enable the diaphragm to respond freely to variations in pressures exerted against opposite sides of the same by the liquid in the working chambers, which presses the valve stem against the front side of the diaphragm and the column of liquid which terminates in the pressure chamber 19 and exerts pressure against the rear side of the diaphragm.

In the preferred construction of this shock absorber the front head 29 is connected with the annular wall 26 of the body by means of a screw joint 106 and as this form of joint cannot be made commercially so that the front passage 104 in the front head 29 will always come in exact alignment with the passage 103 in the upper dowel 99, the front end of this last-mentioned passage is flared or enlarged, as shown at 107, thereby presenting a comparatively large area of the passage in this dowel to the rear end of the passage 104 in the front head 29, as best shown in Fig. 5, which permits a certain amount of variation in manufacture and enables the front head 29 to be turned tightly on to the peripheral wall of the body and still insure communication between the replenishing chamber and the balancing chamber.

The rear end of the passage 103 in this dowel is also flared, as shown at 108 in Fig. 5, thereby enabling the operator to assemble this dowel with the upper partition section 32 and the adjacent part of the rear head without exercising any care as to which end of this dowel is at the front or rear and still insure communication between the front end of this dowel and the passage 104 in the front head 29.

During the operation of each of these shock absorbers in the manner described in accordance with this improvement, each diaphragm or displacing piston 65 exerts a pressure against the controlling or regulating liquid column in accordance with the strength of its spring 68 and the pressure of the resistance liquid in the working chambers against the face of the regulating valve 60 while the pistons in the respective shock absorber are effecting a high compression stroke.

If only one of the shock absorbers is subjected to a shock due to the spring on the corresponding end of the axle moving in a direction which will produce a rebound on the adjacent spring system, and cause a greater pressure on the face of the valve 60 when combined with the pressure of the companion spring 68, such greater pressure will be transmitted through the medium of the several branches of the controlling liquid column to the pressure chambers in rear of the diaphragms of the other shock absorbers. This causes the valve 60 of the other shock absorbers to be closed to a greater extent so that flow of resistance liquid in these other shock absorbers from the high pressure ends of the working chambers to the low pressure ends of the same will be more restricted and thereby cause these other shock absorbers to work harder. It will thus be apparent that by this means any increased load upon one of the shock absorbers will be transmitted to the remaining shock absorbers of the system and produce a uniform action of the several shock absorbers in response to any shock to which one or more of the absorbers may be subjected.

If any leakage of resistance liquid should occur between the stem 61 of any regulating valve 60 and its guideway 62 such leakage will merely enter the respective balancing chamber 63 and pass from thence to the companion replenishing chamber 46 without escaping to the outside of the instrument.

In the construction shown in the drawings all four of the shock absorbers, comprising two associated with the front axle and two associated with the rear axle are all interconnected through the medium of the hydraulic controlling column so that one adjustment of the pressure by the shifting of the piston or plunger 76 will operate to determine the cushioning effect of all the absorbers on a car.

This invention, capable of use in controlling either a single shock absorber at a point remote from the absorber as well as a plurality of such absorbers, makes it also possible to separate the controlling system of one group of absorbers from those in another group—as for example, in the case of an automobile in which one end at times may be carrying a heavier load than the other end.

In an organization of the character last-mentioned the shock absorbing effect of the instruments associated with one axle may be either more or less than the shock absorbing effect of the instruments associated with the other axle, and this permits of readily adapting each end of the automobile in accordance with the particular load which the same is intended to carry at any particular time. This is of importance in an automobile bus in which the load upon the front axle may vary only slightly from time to time but the load upon the rear axle may vary considerably from time to time due to the variation in the number of passengers which may be carried during different parts of the day.

It is thus possible to conveniently adjust the cushioning effect of the absorber so as to properly cushion the load regardless of whether the load is light or heavy.

From the foregoing it will now be clear that this shock absorbing system not only permits of ascertaining the quality of the ride which may be expected from the shock absorbers, but also indicates whether the adjustment of the absorbers is best suited for a particular road over which the car is to be driven, and whether there is any changed condition which requires a different setting or adjustment of the controlling liquid column.

Moreover, by locating the adjustment of a single absorber or a plurality of absorbers at a point on the car which is remote from the absorbers but conveniently accessible to the driver, it is possible for the latter to affect adjustment easily and conveniently while the car is in operation, and by connecting the master cylinder directly with the pressure chambers of all the shock absorbers the pressure in the several instruments will be uniform in accordance with the strength of the respective springs 68 which have been employed in each of the instruments.

In the modified form of the device for varying the pressure on the adjusting liquid column, shown in Fig. 9, the master cylinder 110 is secured to the front side of the wall or bracket 75 arranged adjacent to the front side of the instrument board and the piston 111 therein is moved back and forth by means of a connecting rod having a front section 112 sliding through a stuffing box 113 at the rear end of the master cylinder 110 and connected by a ball and socket joint 114 with the piston 111, and a rear section 115 connected by a screw joint 116 with a nut or sleeve 117 on the instrument board 75, while its front end is pivotally connected by a pin 118 with the rear end of the front section 112. Upon turning the screw 115 by means of a button or finger piece 119 at its rear end piston 111 may be moved forwardly or backwardly in order to obtain the desired pressure on the liquid column in the cylinder 110 and the branch pipes 72 leading to the pressure chambers 19 of the several shock absorbers.

In this construction the master cylinder 110 is not surrounded by a liquid replenishing chamber but instead a replenishing chamber or cup 120 is mounted on the upper side of the cylinder 110 and provided with an outlet 121 at its lower end which may be uncovered by moving the piston and its packing 122 rearwardly far enough into an abnormal position so that this packing uncovers the outlet 121 of this replenishing chamber and thus permits some of the liquid from this chamber to flow into the master cylinder 110. After the column of pressure liquid has been thus replenished the piston 111 is again moved forwardly so as to cover the outlet 121 of the replenishing chamber, and during the subsequent adjustment of this piston its normal range of movement is confined to the space within the cylinder 110 between the front head 71 thereof and a point in front of the outlet 121, so that the latter is at no time uncovered during the normal operation of the apparatus.

Replenishing of the chamber 120 is effected through an opening in its top which is normally closed by a plug 123, as shown in Fig. 9.

I claim as my invention:

1. A shock absorber comprising a body having a working chamber adapted to contain a resistance liquid, a piston moving in said chamber, a regulating passage connecting one part of said chamber with another, a regulating valve for varying the capacity of said regulating passage, a replenishing chamber connected with said working chamber, a balancing chamber communicating with said replenishing chamber, a pressure chamber, a diaphragm interposed between said balancing chamber and said pressure chamber and operating on said regulating valve, an adjusting cylinder, a conduit connecting said adjusting cylinder with said pressure chamber, said pressure chamber, adjusting cylinder and conduit adapted to contain a controlling liquid column, and an adjusting piston arranged in said adjusting cylinder.

2. A shock absorber comprising a body having a working chamber adapted to contain a resistance liquid, a piston moving in said chamber, a regulating passage connecting one part of said chamber with another, a regulating valve for varying the capacity of said regulating passage, a replenishing chamber connected with said working chamber, a balancing chamber communicating with said replenishing chamber, a pressure chamber, a diaphragm interposed between said balancing chamber and said pressure chamber and operating on said regulating valve, an adjusting cylinder, a conduit connecting said adjusting cylinder with said pressure chamber, said pressure chamber, adjusting cylinder and conduit adapted to contain a controlling liquid column, an adjusting piston arranged in said adjusting cylinder, and a liquid pressure indicator connected with said adjusting cylinder and responsive to variations in pressure on said liquid column.

3. A shock absorber comprising a body having a working chamber adapted to contain a resistance liquid, a piston moving in said chamber, a regulating passage connecting one part of said chamber with another, a regulating valve for varying the capacity of said regulating passage, a replenishing chamber connected with said working chamber, a balancing chamber communicating with said replenishing chamber, a pressure chamber, a diaphragm interposed between said balancing chamber and said pressure chamber and operating on said regulating valve, an adjusting cylinder, a conduit connecting said adjusting cylinder with said pressure chamber, said pressure chamber, adjusting cylinder and conduit adapted to contain a controlling liquid column, an adjusting piston arranged in said adjusting cylinder and a spring for holding said regulating valve in engagement with said diaphragm.

4. A shock absorber comprising a body having a working chamber adapted to contain a resistance liquid, a piston moving in said chamber, a regulating passage connecting one part of said chamber with another, a regulating valve for varying the capacity of said regulating passage, a replenishing chamber connected with said working chamber, a balancing chamber communicating with said replenishing chamber, a pressure chamber, a diaphragm interposed between said balancing chamber and said pressure chamber and operating on said regulating valve, an adjusting cylinder, a conduit connecting said adjusting cylinder with said pressure chamber, said pressure chamber, adjusting cylinder and conduit adapted to contain a controlling liquid column, an adjusting piston arranged in said adjusting cylinder, and a liquid replenishing tank having a replenishing port opening into said adjusting cylinder, said replenishing port being arranged beyond the normal movement of said piston and adapted to be uncovered by shifting said piston beyond its normal movement.

5. A shock absorber comprising a body having a working chamber adapted to contain a resistance liquid, a piston moving in said chamber, a regulating passage connecting one part of said chamber with another, a regulating valve for varying the capacity of said regulating passage, a replenishing chamber connected with said working chamber, a balancing chamber communicating with said replenishing chamber, a pressure chamber, a diaphragm interposed between said balancing chamber and said pressure chamber and operating on said regulating valve, an adjusting cylinder, a conduit connecting said adjusting cylinder with said pressure chamber, said pressure chamber, adjusting cylinder and conduit adapted to contain a controlling liquid column, an adjusting piston arranged in said adjusting cylinder, a liquid replenishing tank having a replenishing port opening into said adjusting cylinder, said replenishing port being arranged beyond the normal movement of said piston and adapted to be uncovered by shifting said piston beyond its normal movement, and means for shifting said piston including an inner rock arm engaging said piston, a rock shaft connected with said inner arm, an outer arm connected with said rock shaft, an adjusting screw connected with said outer rock arm, and a fixed screw sleeve which receives said adjusting screw.

6. A shock absorber comprising a body having a working chamber adapted to contain a resistance liquid, a piston moving in said chamber, a regulating passage connecting one part of said chamber with another, a regulating valve for varying the capacity of said regulating passage, a replenishing chamber connected with said working chamber, a balancing chamber communicating with said replenishing chamber, a pressure chamber, a diaphragm interposed between said balancing chamber and said pressure chamber and operating on said regulating valve, an adjusting cylinder, a conduit connecting said adjusting cylinder with said pressure chamber, said pressure chamber, adjusting cylinder and conduit adapted to contain a controlling liquid column, an adjusting piston arranged in said adjusting cylinder, a liquid replenishing tank having a replenishing port opening into said adjusting cylinder, said replenishing port being arranged beyond the normal movement of said piston and adapted to be uncovered by shifting said piston beyond its normal movement, and means for shifting said piston including an inner rock arm engaging said piston for shifting the same in one direction, and a spring for shifting said piston in the opposite direction.

7. A shock absorber comprising a body having a working chamber adapted to contain a resistance liquid, a piston moving in said chamber, a regulating passage connecting one part of said chamber with another, a regulating valve for varying the capacity of said regulating passage, a replenishing chamber connected with said working chamber, a balancing chamber communicating with said replenishing chamber, a pressure chamber, a diaphragm interposed between said balancing chamber and said pressure chamber and operating on said regulating valve, an adjusting cylinder, a conduit connecting said adjusting cylinder with said pressure chamber, said pressure chamber, adjusting cylinder and conduit adapted to contain a controlling liquid column, an adjusting piston arranged in said adjusting cylinder, a liquid replenishing tank having a replenishing port opening into said adjusting cylinder, said replenishing port being arranged beyond the normal movement of said piston and adapted to be uncovered by shifting said piston beyond its normal movement, said replenishing tank enclosing said adjusting cylinder and piston.

8. A shock absorber comprising a body having a working chamber adapted to contain a resistance liquid, a piston moving in said chamber, a regulating passage connecting one part of said chamber with another, a regulating valve for varying the capacity of said regulating passage, a replenishing chamber connected with said working chamber, a balancing chamber communicating with said replenishing chamber, a pressure chamber, a diaphragm interposed between said balancing chamber and said pressure chamber and operating on said regulating valve, an adjusting cylinder, a conduit connecting said adjusting cylinder with said pressure chamber, said pressure chamber, adjusting cylinder and conduit adapted to contain a controlling liquid column, an adjusting piston arranged in said adjusting cylinder, a liquid replenishing tank having a replenishing port opening into said adjusting cylinder, said replenishing port being arranged beyond the normal movement of said piston and adapted to be uncovered by shifting said piston beyond its normal movement, said replenishing tank enclosing said adjusting cylinder and piston, and a safety valve arranged between said adjusting cylinder and said replenishing tank.

9. A shock absorber comprising a body having a rear head and a working chamber adapted to contain a resistance liquid, a piston moving in said chamber and having a hub, a plug secured to the rear head, a regulating conduit connecting one part of said working chamber with another part thereof including a front regulating chamber formed in the hub of the piston and having ports communicating with one end of said working chamber, a rear regulating chamber formed between said head and plug and communicating with another end of said working chamber and an axial passage arranged in said head and connecting said front and rear regulating chambers and provided with a valve seat, a valve stem slidable lengthwise in said plug and having a regulating valve at its front end which is movable relative to said seat, a cap connected with said rear head, a diaphragm arranged between said rear head and said cap and engaging with the rear end of said valve stem and forming with said head a balancing chamber around said valve stem and a pressure chamber between the rear side of the diaphragm and said cap, and means for producing variable liquid pressure in said pressure chamber.

10. A shock absorber comprising a body having a rear head and a working chamber adapted to contain a resistance liquid, a piston moving in said chamber and having a hub, a plug secured to the rear head, a regulating conduit connecting one part of said working chamber with another part thereof including a front regulating chamber formed in the hub of the piston and having ports communicating with one end of said working chamber, a rear regulating chamber formed between said head and plug and communicating with another end of said working chamber and an axial passage arranged in said head and connecting said front and rear regulating chambers and provided with a valve seat, a valve stem slidable lengthwise in said plug and having a regulating valve at its front end which is movable relative to said seat, a cap connected with said rear head, a diaphragm arranged between said rear head and said cap and engaging with the rear end of said valve stem and forming with said head a balancing chamber around said valve stem and a pressure chamber between the rear side of the diaphragm and said cap, means for producing variable liquid pressure in said pressure chamber, and a liquid replenishing chamber communicating with said balancing chamber.

11. A shock absorber comprising a body having a rear head and a working chamber adapted to contain a resistance liquid, a piston moving in said chamber and having a hub, a plug secured to the rear head, a regulating conduit connecting one part of said working chamber with another part thereof including a front regulating chamber formed in the hub of the piston and having ports communicating with one end of said working chamber, a rear regulating chamber formed between said head and plug and communicating with another end of said working chamber and an axial passage arranged in said head and connecting said front and rear regulating chambers and provided with a valve seat, a valve stem slidable lengthwise in said plug and having a regulating valve at its front end which is movable relative to said seat, a cap connected with said rear head, a diaphragm arranged between said rear head and said cap and engaging with the rear end of said valve stem and forming with said head a balancing chamber around said valve stem and a pressure chamber between the rear side of the diaphragm and said cap, means for producing variable liquid pressure in said pressure chamber, a front head for said working chamber, a partition in said working chamber, a dowel arranged in said partition and extending into said rear head, a replenishing chamber arranged in front of the working chamber, and a liquid passage connecting said replenishing chamber and said balancing chamber and extending through said front and rear heads and said dowel.

12. A shock absorber comprising a body having a rear head and a working chamber adapted to contain a resistance liquid, a piston moving in said chamber and having a hub, a plug secured to the rear head, a regulating conduit connecting one part of said working chamber with another part thereof including a front regulating chamber formed in the hub of the piston and having ports communicating with one end of said working chamber, a rear regulating chamber formed between said head and plug and communicating with another end of said working chamber and an axial passage arranged in said head and connecting said front and rear regulating chambers and provided with a valve seat, a valve stem slidable lengthwise in said plug and having a regulating valve at its front end which is movable relative to said seat, a cap connected with said rear head, a diaphragm arranged between said rear head and said cap and engaging with the rear end of said valve stem and forming with said head a balancing chamber around said valve stem, and a pressure chamber between the rear side of the diaphragm and said cap, means for producing variable liquid pressure in said pressure chamber, a front head for said working chamber, a partition in said working chamber, a dowel arranged in said partition and extending into said rear head, a replenishing chamber arranged in front of the working chamber, and a liquid passage connecting said replenishing chamber and said balancing chamber and extending through said front and rear heads and said dowel, the front end of the passage in said dowel being flared.

13. A shock absorber comprising a body having a rear head and a working chamber adapted to contain a resistance liquid, a piston moving in said chamber and having a hub, a plug secured to the rear head, a regulating conduit connecting one part of said working chamber with another part thereof including a front regulating chamber formed in the hub of the piston and having ports communicating with one end of said working chamber, a rear regulating chamber formed between said head and plug and communicating with another end of said working chamber and an axial passage arranged in said head and connecting said front and rear regulating chambers and provided with a valve seat, a valve stem slidable lengthwise in said plug and having a regulating valve at its front end which is movable relative to said seat, a cap connected with said rear head, a diaphragm arranged between said rear head and said cap and engaging with the rear end of said valve stem and forming with said head a balancing chamber around said valve stem and a pressure chamber between the rear side of the diaphragm and said cap, and means for producing variable liquid pressure in said pressure chamber, and a vent valve for said pressure chamber.

14. A shock absorber comprising a body having a working chamber adapted to contain a resistance liquid, a piston movable in said chamber against the flow resistance of said liquid, a bypass for flow of liquid from one side of the piston to the other, a regulating valve for said bypass, a replenishing chamber connected with said working chamber, a balancing chamber communicating with said replenishing chamber, a pressure chamber, a pressure transmitting member interposed between said balancing chamber and said pressure chamber and operating on said regulating valve, and means controllable from a distance for applying fluid under pressure against said pressure transmitting member for adjustment thereby of said regulating valve.

15. A shock absorber comprising a body having a working chamber adapted to contain a resistance liquid, a piston movable in said chamber against the flow resistance of said liquid, a regulating passage connecting one part of said chamber with another, an inner diaphragm chamber and an outer diaphragm chamber separated by a diaphragm, a regulating valve for said regulating passage extending into said inner diaphragm chamber for engagement by said diaphragm, a replenishing chamber for said working chamber connected with said inner diaphragm chamber, and means for introducing fluid under pressure into said outer diaphragm chamber for exerting pressure against said diaphragm and thereby regulating movement of said regulating valve relative to said regulating passage.

16. A hydraulic shock absorber comprising a frame structure enclosing a cylindrical space at one end and a replenishing chamber at the other end, a partition dividing said cylindrical space into high and low pressure chambers, a dowel pin securing said partition to said frame structure and having a longitudinal bore therethrough, a piston movable in said chamber against the flow resistance of liquid within said chamber, a bypass for flow of liquid from one side of the piston to the other, a regulating valve for said bypass, a balancing chamber and a passageway connecting said balancing chamber with said replenishing chamber, said passageway including said dowel pin bore, a pressure chamber, a pressure transmitting member interposed between said balancing chamber and said pressure chamber and operating on said regulating valve, and means controllable from a distance for applying fluid under pressure against said pressure transmitting member for adjustment thereby of said regulating valve.

RALPH F. PEO.